United States Patent
Roger (10) Patent No.: US 8,600,375 B2
(45) Date of Patent: Dec. 3, 2013

(54) METHOD FOR OPTIMIZING THE REDUCTION OF MOBILITY SIGNALLING AT INTER-RAT CHANGE

(75) Inventor: Vincent Roger, Reading (GB)

(73) Assignee: NEC Corporation, Tokyo (JP)

( * ) Notice: Subject to any disclaimer, the term of this patent is extended or adjusted under 35 U.S.C. 154(b) by 103 days.

(21) Appl. No.: 13/144,212

(22) PCT Filed: Jan. 26, 2010

(86) PCT No.: PCT/JP2010/051313
§ 371 (c)(1),
(2), (4) Date: Jul. 12, 2011

(87) PCT Pub. No.: WO2010/087469
PCT Pub. Date: Aug. 5, 2010

(65) Prior Publication Data
US 2011/0275371 A1  Nov. 10, 2011

(30) Foreign Application Priority Data
Jan. 30, 2009 (EP) .................................. 09151818

(51) Int. Cl.
*H04W 4/00* (2009.01)
*H04W 36/00* (2009.01)

(52) U.S. Cl.
USPC ............... 455/432.1; 455/434; 455/435.1; 455/436

(58) Field of Classification Search
USPC .............. 455/434, 432.1, 435.1, 436
See application file for complete search history.

(56) References Cited

U.S. PATENT DOCUMENTS 8,233,923 B2 * 7/2012 Kulakov et al. ............... 455/458

FOREIGN PATENT DOCUMENTS

| CN | 101180909 A | 5/2008 |
|---|---|---|
| WO | 2007/007990 A1 | 1/2007 |
| WO | 2008/136531 A1 | 11/2008 |

OTHER PUBLICATIONS

3GPP TS 23.401 V8.4.1 (Dec. 2008), All pages.*
3GPP TS23.401 V8.8.0, "3rd Generation Partnership Project; Technical Specification Group Services and System Aspects; General Packet Radio Services (GPRS) enhancements for Evolved Universal Terrestrial Radio Access Network (E-UTRAN) access (Release 8)," Dec. 15, 2009, pp. 123-154, http://www.3gpp.org/ftp/Specs/archive/23_series/23.401/23401-880.zip.

(Continued)

Primary Examiner — Kamran Afshar
Assistant Examiner — Omoniyi Obayanju
(74) Attorney, Agent, or Firm — Sughrue Mion, PLLC (57) ABSTRACT

Method for optimizing the reduction of mobility signaling after an Inter-RAT change for a UE roaming between a source area covered by a source telecommunication core network and a target area covered by a target core telecommunication network, wherein a signaling reduction function is activated by the source telecommunication core network, and wherein deactivation triggering events of the signaling reduction function generates a need for registration update at next IRAT change occurred. The method comprises the steps: storing in the UE a parameter the value of which indicates whether or not the deactivation triggering events of the signaling reduction function only correspond to the UE context modification, and, after the Inter-RAT change,
  checking the event generating the Inter-RAT change, and,
  checking the value of the parameter,
  cancelling the need for registration update or validating the need for registration update depending on the event generating the Inter-RAT change and on the value of the stored parameter.

15 Claims, 7 Drawing Sheets

(56) References Cited

OTHER PUBLICATIONS

Panasonic, "Inter-RAT Handover from E-UTRAN to UTRAN," 3GPP TSG RAN WG2 #56, R2-063151, Nov. 2006, http://ftp.3gpp.org/ftp/tsg_ran/WG2_RL2/TSGR2_56/Documents /R2-063151.zip.

3GPP TSG-SA WG2 Meeting #67 S2-086109, "Inter RAT Handover corrections. Other action, indication and terminology alignments/corrections," Aug. 25-29, 2008, http://3gpp.org/specs/CR.htm, V8.2.0.

3GPP TS 23.401 V8.4.0, "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 8)," Dec. 2008, http://www.3gpp.org.

3GPP TSG SA WG2 Meeting #67 TD S2-086110, "Triggering TAU," Aug. 25-29, 2008, http://www.3gpp.org/specs/CR.htm, V8.2.0.

3GPP TSG SA WG2 Meeting #71 TD S2-090878, "ISR local reactivation when UE handovers back to a previously registered area," Feb. 16-20, 2009, http://www.3gpp.org/specs/CR.htm, V8.4.1.

Office Action, dated Aug. 5, 2013, issued by the State Intellectual Property Office of P.R. China in counterpart Chinese Patent Application No. 201080006336.9.

* cited by examiner

METHOD FOR OPTIMIZING THE REDUCTION OF MOBILITY SIGNALLING AT INTER-RAT CHANGE

CROSS REFERENCE TO RELATED APPLICATION

This application is a National Stage of International Application No. PCT/JP2009/051213 filed Jan. 26, 2010, claiming priority based on European Patent Application No. 09151818.3, filed Jan. 30, 2009, the contents of all of which are incorporated herein by reference in their entirety.

TECHNICAL FIELD

The invention pertains to telecommunication field and concerns a method for optimizing the reduction of mobility signalling after an Inter-RAT change for a UE roaming between a source area covered by a source telecommunication core network having a source RAT and a target area covered by a target core telecommunication network having a target RAT, wherein a signalling reduction function is activated by the source telecommunication core network, and wherein deactivation triggering events of the signalling reduction function generating a need for registration update at next IRAT change occurred.

The invention concerns also a User Equipment adapted for implementing said method.

BACKGROUND ART

In 3GPP packet networks with GERAN/UTRAN (2G/3G) access, the UE is registered in the Core Network element SGSN via an attach or Routing Area procedure. The SGSN holds a UE context (mobile identity, security parameters) and knows the location of the User Equipment (UE) with Routing Area accuracy. The UE can move freely within the registered RA (Routing Areas), without initiating Routing Area Update procedure, as long as the periodic timer does not expire.

Similarly, in 3GPP packet networks with E-UTRAN (LTE), the UE is registered in the Core Network element MME via an attach or Tracking Area procedure. The MME holds a UE context (mobile identity, security parameters) and knows the location of the UE with a list of Tracking Areas accuracy. The UE can move freely within the registered list of TAs (Tracking Areas), without initiating Tracking Area Update procedure, as long as the periodic timer does not expire.

For E-UTRAN UEs with GERAN or UTRAN capabilities, when the UE reselects between GERAN/UTRAN access and E-UTRAN access, the UE initiates a Routing Area update when leaving EUTRAN access for GERAN/UTRAN in order to register to the SGSN, and the UE initiates a Tracking Area update when leaving GERAN/UTRAN access for EUTRAN access in order to register to the MME.

3GPP has specified a mechanism, called the Idle mode Signaling Reduction (ISR) for reducing the mobility related signaling, i.e. the RAU/TAU procedures when the UE is moving between EUTRAN and GERAN/UTRAN.

Figure 1:
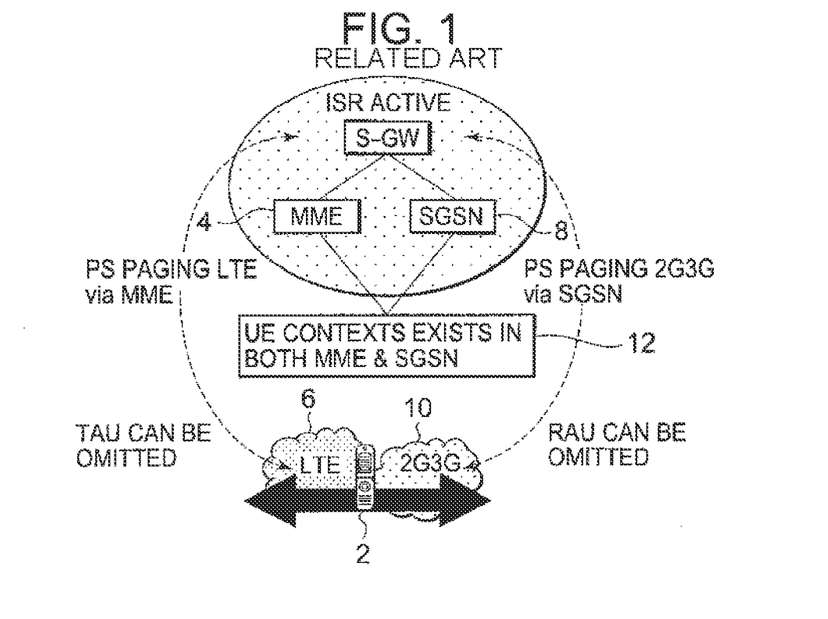
FIG. 1, previously described, schematically illustrates a related art Idle-mode signaling reduction principles with double registration, double paging, registration update reduction when UE reselects between EUTRAN and GERAN/UTRAN within the registration areas, FIG. 2, previously described, schematically illustrate a related art UE context transfer and ISR activation negotiation between MME and SGSN UE after an Inter-RAT change in idle mode, FIG. 3, previously described, schematically illustrates a related art UE context (re-)synchronization principle in idle-mode, FIG. 4, previously described, schematically illustrates UE context (re-)synchronization principle in connected mode (IRAT handover), FIG. 5, previously described, schematically illustrates a related art limitation of signaling reduction in connected mode, FIG. 6 schematically illustrates an improved signaling reduction according to the invention.

At FIG. 1, it is assumed that the ISR function is activated, and thus the UE 2 is simultaneously registered both in a list of Tracking Areas managed by the MME 4 via the EUTRAN Access Network (LTE) 6 and in a Routing Area managed by the SGSN 8 of the GERAN/UTRAN Access Network (2G/3G) 10.

If the ISR function is activated by the network, both MME 4 and SGSN 8 hold a UE context 12 synchronized with each other. The UE 2 can then move freely between the registered list of Tracking Areas (TAs) in EUTRAN and the registered Routing Area (RA) in GERAN/UTRAN 1 without the need to initiate any registration update towards the MME 4 or the SGSN 8.

ISR reduces the mobility-related signalling when the UE reselects in idle-mode between EUTRAN and GERAN/UTRAN registered areas. It achieves signalling load reduction in the network and allows the UE to remain in idle mode and thereby to save battery.

Figure 2:
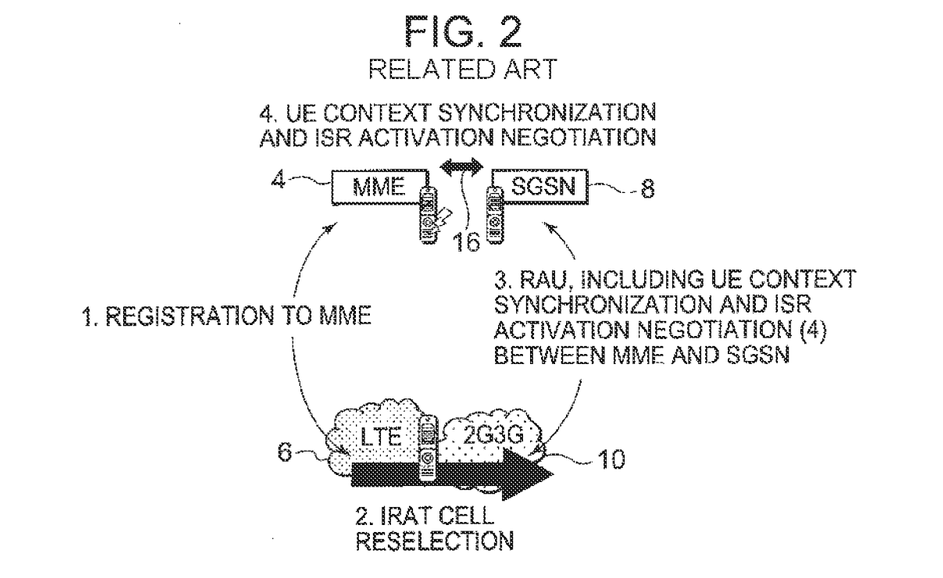

At FIG. 2, it is assumed that the UE is registered in a list of Tracking Areas managed by the MME 4 via the EUTRAN (LTE) Access Network 6 and that the ISR function is not activated by the network. If the UE 2 moves to the target Radio Access Technology (RAT) 2G/3G 10, it shall perform the registration update procedure (Routing Area Update RAU) in the target 2G/3G Network 10, triggering the ISR support negotiation and the UE context synchronization (arrow 16) between the MME 4 and the SGSN 8.

If the ISR function is activated by the target Core Network (CN) node (SGSN 8), the network indicates 'ISR activated' to the UE 2 in the registration update (RAU) accept message. The UE 2 is registered in the target Routing Area managed by the SGSN 8 of the 2G/3G Network 10 via the GERAN/UTRAN Access Network and remains also registered in the list of Tracking Areas previously assigned by the MME 4 via the EUTRAN Access Network of the source LTE Network 6. When the ISR is activated by the MME 4, the network indicates 'ISR activated' in the TAU accept.

Figure 3:
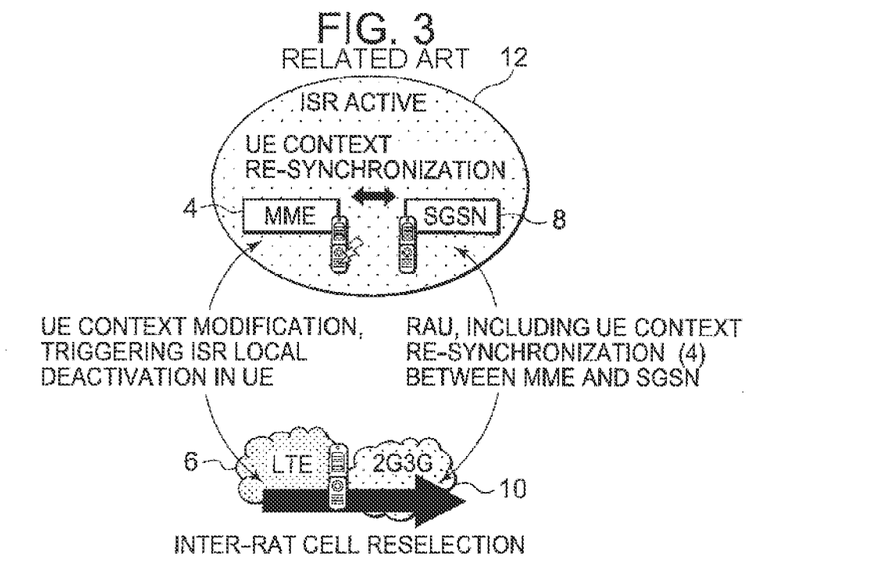

At FIG. 3, it is assumed that the UE 2 is camping in a cell of the source LTE Network 6 and that the ISR function is activated.

If the UE context is modified in the UE 2 and in the Core Network Element of the currently used RAT (the MME 4 of the EUTRAN Access Network 6), i.e. the RAT where the UE is camping, then the UE context in the Core Network Element of the currently not used RAT (the SGSN 8 of the 2G/3G Network 10) becomes unsynchronized.

Such UE context unsynchronization between UE 2, MME 4 and SGSN 8 is caused when a bearer context (PDP context in 2G3G or EPS bearer context in LTE) is added or modified, or when the UE changes a MM context parameter like UE specific DRX parameter or UE Core Network Capability.

If the UE 2 moves back to the target 2G/3G Network 10, the UE context in the SGSN 8 shall be re-synchronized with the UE context of the MME 4 to allow the UE 2 to maintain the established services (packet, security . . . ).

Such special situation where the UE context is modified in one RAT in the UE and the CN node of this RAT, causing the unsynchronization of the UE context in the CN node of the other RAT, is resolved in the current 3GPP specification with the ISR deactivation locally in the UE, generating a need for registration update at next IRAT change, in order to guarantee that the CN node in the other RAT is updated at the next Inter-RAT (IRAT) change via a UE context resynchronization.

In order to force this resynchronization, the UE 2 locally deactivates the ISR procedure in the RAT (the EUTRAN 6 in the example of FIG. 2) where the UE context is modified so that a registration update procedure is forcibly initiated when the UE 2 returns to the target RAT (the GERAN/UTRAN 10). During the registration update procedure, the UE context of the source RAT MME 4 is transferred to the target RAT SGSN 8.

In idle mode, when the UE 2 reselects between the source RAT and the target RAT, the UE context transfer from source RAT CN node to target RAT CN node is performed during the registration update procedure in the target RAT initiated by the UE 2.

As described in 3GPP 23.401 5.3.3 (TAU procedures), upon TAU triggered by inter-RAT cell reselection by the UE, the target RAT Core Network (CN) node fetches the UE context and ISR support from the source RAT CN node, using Context Request message, and, once received in Context Response message, it provides the ISR activated status to the source RAT CN node in Context Acknowledge message.

3GPP has initially designed the signaling reduction for idle-mode when the UE 2 moves in idle mode and reselects between E-UTRAN and GERAN/UTRAN cells within the registered areas. 3GPP has then extended the ISR procedures of the idle-mode to the connected mode.

Indeed, as defined by 3GPP 23.401 4.6.3.2 (ECM-CONNECTED mode), UEs in connected mode initiates the TAU procedure in a registered tracking area only if TIN is set to 'PTMSI', i.e. ISR is deactivated, similarly to the idle mode behavior.

This extension enables the UE 2 to omit the TAU/RAU in connected mode when ISR is activated and UE 2 is handovered within the registered areas.

Therefore the signaling reduction illustrated in FIG. 1 for inter-RAT cell reselection in idle mode also applies in case of inter-RAT handover.

Moreover, as defined by 3GPP 23.401 5.5.2 (Inter-RAT handover), the ISR activation negotiation and UE context synchronization between the source RAT CN node and the target RAT CN node are performed during Inter-RAT handovers (FIG. 4), similarly to the idle-mode where it is performed during the TAU/RAU procedures initiated by UE 2 (FIG. 2).

During the inter-RAT handover initiated by the network (FIG. 4), as described in 3GPP 23.401 5.5.2 (Inter-RAT handover), the UE context and ISR support is pushed by the source RAT CN node to the target RAT CN node using Forward Relocation Request message, and the target RAT CN node returns the ISR activated status to the source RAT CN node in Forward Relocation Complete message. If the UE 2 performs a registration update procedure in the target RAT (e.g. UE moves outside the registered area in the target RAT), a reduced registration update without the UE context transfer between the CN nodes occurs in the network, because they already occurred during the handover procedure.

Figure 4:
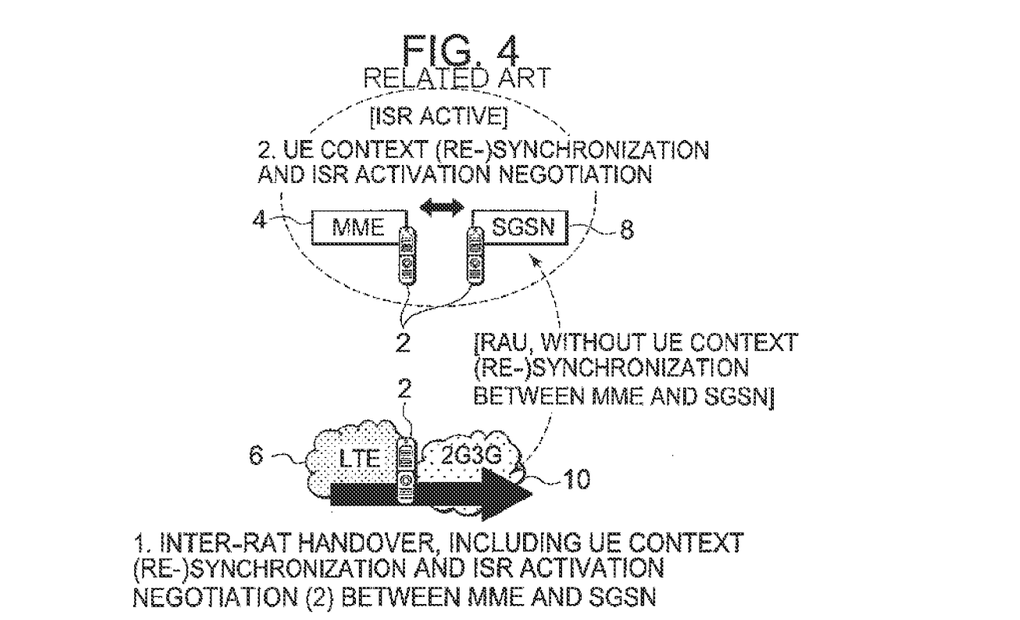

At FIG. 4, it is assumed that the UE 2 moves from the LTE Network 6 (source RAT) to the 2G/3G Network 10 (target RAT) via an inter-RAT (IRAT) handover. In this case, the UE context 12 stored in MME 4 is transferred to the SGSN 8 during the handover procedure. After the inter-RAT handover, the UE contexts stored in the SGSN 8 and MME 4 are therefore resynchronized in the network. Then, the registration update in the target RAT after the handover procedure is performed if the ISR function was not activated by network, or if the UE 2 deactivated the ISR procedure locally, or if a regular trigger in the target RAT occurred (e.g. new area not yet registered . . . ).

Primarily designed for reducing mobility signaling at inter-system change in idle-mode, the ISR feature also achieves signaling reduction at inter-system handover. As per 3GPP 23.401, while the UE camps in one RAT, the source RAT, the modification of the UE context (bearer context, DRX specific parameter, UE Core Network capabilities) causes unsynchronized state information between UE, SGSN and MME. This special situation is resolved with the ISR deactivation locally in the UE in order to guarantee that the CN node in the source RAT transfers the latest UE context to the CN node of the target RAT, in the Context Response message, during the registration update procedure initiated by the UE at the next IRAT cell reselection.

However, when the inter-RAT change is a handover, the CN node from the source RAT already transfers the UE context to the CN node of the target RAT in Forward Relocation Request message during the handover procedure.

Figure 5:
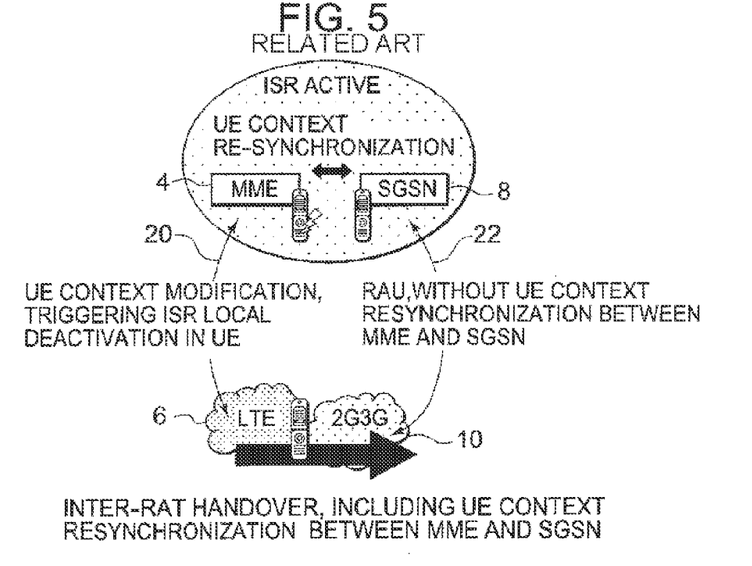

Therefore, when the ISR function is activated by the network and locally deactivated in the UE 2 only as a result of a UE context modification (arrow 20) in source RAT as illustrated at FIG. 5, the UE 2 performs the registration update (arrow 22) when moving to the 2G/3G Network 10 and thus the signaling is not reduced.

In such situation, this registration update is unnecessary when the IRAT change is a handover and the target cell belongs to a previously registered area because the CN nodes MME and SGSN are unchanged, and the target CN node SGSN 8 already received the UE context from source CN node MME 4 in Forward Relocation Request message during the handover procedure.

Indeed, contrary to the idle mode where the registration update in the target RAT is required to resynchronize the CN node in the target RAT when ISR was locally deactivated in the source RAT due to UE context modification (FIG. 3), the UE context in the connected mode case is already resynchronized during the handover procedure (FIG. 4) before any registration update is initiated. Thus the registration update procedure is not required for UE context synchronization purpose when the UE is handovered to a previously registered area and ISR was deactivated in the source RAT in the UE for the only reason of updating the UE context in the CN node of the target RAT at next IRAT change.

Numerous triggers for ISR local deactivation have been defined by 3GPP, e.g. bearer context modification, change of DRX parameter, change of UE CN capabilities and thus, the efficiency of the signaling reduction targeted by ISR is decreased.

The invention aims at improving the efficiency of signaling reduction in case of inter-RAT handover, when ISR is activated by the network and the triggering events of the ISR deactivation in the source RAT generating a need for registration update at next IRAT change only correspond to a UE context modification in the source RAT and when the UE is handovered back from a source area covered by a source Telecommunication Network and to an already registered target area covered by a target Telecommunication Network.

DISCLOSURE OF THE INVENTION

The object of the invention is achieved by means of a method for optimizing the reduction of mobility signalling after an Inter-RAT change for a UE roaming between a source area covered by a source telecommunication core network having a source RAT and a target area covered by a target core telecommunication network having a target RAT, wherein a signalling reduction function is activated by the source telecommunication core network, and wherein deactivation triggering events of the signalling reduction function generates a need for registration update at next IRAT change occurred.

The method according to the invention comprises the following steps:

a—storing in the UE a parameter the value of which indicates whether or not the deactivation triggering events of the signaling reduction function only correspond to the UE context modification in the source RAT, and, after the Inter-RAT change, b—checking the event generating the Inter-RAT change, and, c—checking the value of the parameter, d—cancelling the need for registration update or validating the need for registration update depending on the event generating the Inter-RAT change and on the value of the stored parameter.

In a first embodiment of the invention, the method comprises the step consisting in cancelling the need for registration update if event generating the Inter-RAT change is a handover to an area already registered with the CN node of the target RAT and if the deactivation triggering events of the signaling reduction function only correspond to the UE context modification in the source RAT.

In a second embodiment of the invention, the method comprises the step consisting in validating the need for registration update if event generating the Inter-RAT change is a handover to an area not already registered with the CN node of the target RAT.

In a third embodiment of the invention, the method comprises the step consisting in validating the need for registration update if event generating the Inter-RAT change is an idle-mode cell reselection.

Before the Inter-RAT change, the signalling reduction function is either in an active state or in an inactive state according to the value of a TIN parameter stored in the UE.

In a first variant of the invention, if the signalling reduction function was previously activated by the Network and later on locally deactivated in the UE before the Inter-Rat change because of the occurrence of one or more triggering events of the signalling reduction deactivation generating a need for registration update at next IRAT change, the UE locally reactivates the signalling reduction function by setting the TIN parameter to a value corresponding to the active state for cancelling the need for registration update after the Inter-Rat change. And the UE maintains said signalling reduction function deactivated for validating the need for registration update after the Inter-Rat change.

In a second variant of the invention if the signalling reduction function is locally activated in the UE after the occurrence of one or more triggering events of the signalling reduction deactivation generating a need for registration update at next IRAT change and if the deactivation triggering events of the signaling reduction function only correspond to the UE context modification in the source RAT, then the UE locally deactivates the signalling reduction function by setting the TIN parameter to a value corresponding to the inactive state for validating the need for registration update. And the UE maintains the signalling reduction function activated for cancelling the need for registration update after the Inter-Rat change.

In both cases, the method according to the invention comprises the step consisting in resetting the TIN parameter after cancelling or validating the need for registration update.

In a particular implementation of the invention, the source telecommunication network is a 3GPP evolved packet system Core Network with an E-UTRAN RAT (respectively a 3GPP GPRS Core Network with a GERAN or UTRAN RAT) and the target telecommunication network is a 3GPP GPRS Core Network with a GERAN or UTRAN RAT (respectively 3GPP evolved packet system Core Network with an E-UTRAN RAT).

Preferably, the method according to the invention comprises the step of setting the parameter to the value indicating that the deactivation triggering events of the signaling reduction function generating a need for registration update at next IRAT change only correspond to the UE context modification in the source RAT may result from:

Modification or activation of additional bearers;

updating the source RAT CN node about a change of the UE specific DRX parameters to guarantee that the CN node in the other RAT is updated at the next IRAT change;

updating the source RAT CN node about the change of the UE Core Network Capabilities to guarantee that the CN node in the other RAT is also updated at the next IRAT change.

In the particular implementation of the first variant of the invention, when the UE performs an inter-system handover between GERAN/UTRAN and E-UTRAN to a previously registered area, and the UE deactivated ISR locally only as a result of an activation or modification of a PDP context in GERAN/UTRAN (respectively an EPS bearer context in E-UTRAN), routing area updating in GERAN/UTRAN (respectively a tracking area updating in E-UTRAN) with a change of the UE specific DRX parameter or the UE Core Network capabilities parameter, the UE locally reactivates ISR by setting its TIN to "RAT-related TMSI".

And, in the particular implementation of the second variant of the invention, if the event generating said Inter-RAT change is handover to a new area or an idle-mode cell reselection, and if the deactivation triggering events of the signaling reduction function only correspond to an activation or modification of a PDP context in GERAN/UTRAN (respectively an EPS bearer context in E-UTRAN), routing area updating in GERAN/UTRAN (respectively a tracking area updating in E-UTRAN) with a change of the UE specific DRX parameter or the UE Core Network capabilities parameter, then the UE locally deactivates ISR and thus initiates the registration.

The method according to the invention is implemented by means of a User Equipment (UE) comprising means for reducing the mobility signalling generated by an Inter-RAT change between a source area covered by a source telecommunication core network having a source RAT and a target area covered by a target core telecommunication network having a target RAT, the UE further comprises:

a—means for storing a parameter the value of which indicates whether or not deactivation triggering events of the signalling reduction function generating a need for registration update at next IRAT change only correspond the UE context modification in the source RAT, and, b—means for checking the event generating an Inter-RAT change, and, c—means checking the value of the stored parameter, d—means for either cancelling the need for a registration update or validating the need for a registration update depending on the event generating the Inter-RAT change and on the value of the stored parameter.

Thanks to the invention, when the UE performs an inter-system handover from one RAT (GERAN/UTRAN, resp. E-UTRAN) to the other RAT (E-UTRAN, resp. GERAN/UTRAN) to an already registered area (tracking area included in the TAI list stored in the UE, resp. routing area stored in the UE), and the triggering events of signalling reduction function deactivation generating a need for registration update at next IRAT change only correspond to a UE context modification (a bearer context activation or modification (PDP context, resp. EPS bearer context), or a routing area updating (resp. tracking area updating) with a change of the UE specific DRX parameter or UE network capability parameter) in order to guarantee that the CN node in the other RAT is also updated at next IRAT change, the UE cancels the need for registration update, thereby recovering the signalling reduction activated state silently in the UE. When the IRAT change is an idle-mode cell reselection or a handover to a new area, the UE validates the need for registration and then initiates the registration update signaling procedure.

The signaling reduction activated state recovery is performed autonomously by the UE without peer-to-peer signaling with the network.

The method according to the invention achieves better signaling reduction compared to the related art and thereby enables reducing the processing in the terminal as well as the signaling load with the network.

Additionally, if the UE and the network needs to exchange signaling due to other regular triggers (e.g. periodic timer expires or a new area not yet registered is entered), the method according to the invention enables to immediately reuse the security context from the target RAT previously stored in the UE and the network (i.e. the native security context'), which is the regular behavior from the related art when ISR is activated.

So if the UE initiates a registration procedure after the IRAT handover due to regular triggers, the first message is immediately integrity protected with the native security context.

Furthermore, it shall be noted that the first registration update request from the UE, when triggered, includes the UE identities (Old identity) from the target RAT. The mapping of the identities in the UE that is required with the prior art when ISR is deactivated is thereby avoided.

Without the method according to the invention, the opportunity of reducing signaling at IRAT handover to the previously registered area is lost, and a UE not implementing the method according to the invention will initiate a registration procedure when returning to the other RAT due to the previous local ISR deactivation. In this case, the signaling is not reduced.

Additionally the UE shall use the security context from the source RAT (i.e. the mapped security context) to integrity protect the first message in the target RAT (registration area update request). The network shall then reactivate the native security context with the UE using additional signaling procedure, thereby possibly slowing down the signaling with the UE compared to the signaling used with the method according to the invention.

It shall be noted that the first registration update request from the UE not implementing the invention includes the UE identities (Old identity) from the source RAT mapped to the UE identities of the target RAT along with the an additional identity of the target RAT.

BRIEF DESCRIPTION OF THE FIGURES

The forgoing summary, as well as the following detailed description, will be better understood when read in conjunction with the appended figures illustrating an exemplary embodiment of the invention in which.

BEST MODE FOR CARRYING OUT THE INVENTION

The invention will be described by reference to FIGS. 6 to 9, illustrating an implementation of the invention in a system comprising a source CN node 4 (e.g. MME) of a source mobile Telecommunication Network with a source Access Network (RAT) 6 (e.g. LTE Network), a target CN node 8 (e.g. SGSN) of a target mobile Telecommunication Network with a target Access Network (RAT) 10 (e.g. 2G/3G Network).

Figure 6:
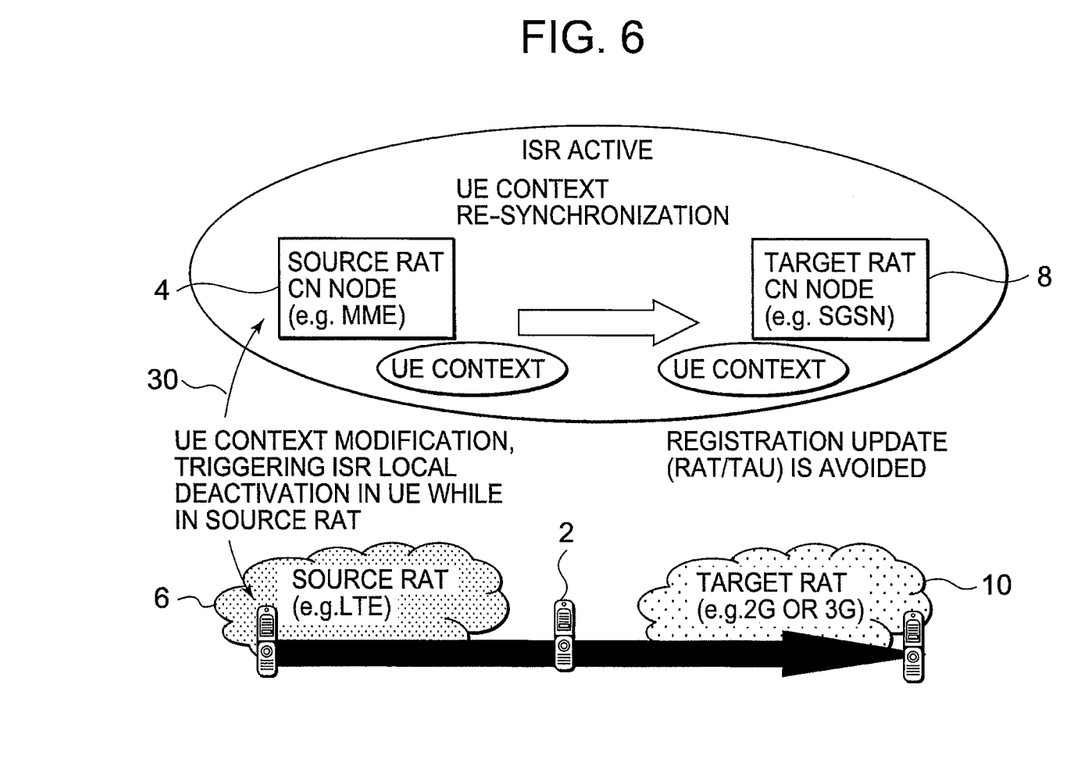

A User Equipment 2 such as a mobile phone is roaming in connected mode, from an area covered by the LTE Network 6 to an area covered by the 2G/3G 10.

It is assumed that all of the User Equipment 2, the source mobile Telecommunication Network 4 and the target mobile Telecommunication Network 2G/3G 10 support ISR procedure (Idle-mode Signaling Reduction).

3GPP 23.401 v8.4.0 (section 4.3.5.6 and Annex J.2) has defined a TIN parameter for storing the status of ISR as follows:

When ISR is in active state, TIN parameter has the value "RAT-related-TMSI".

When ISR is in a deactivated state, TIN parameter has the value "GUTI" in LTE and "PTMSI" in 2G or 3G access.

In order to efficiently control the ISR procedure according to the invention, an adjustable parameter NFR-sync is programmed in the UE 2 to indicate, when one or more triggering events for deactivating ISR occur in the source RAT generating a need for registration update at next IRAT change, whether or not these triggering events only correspond to a modification of a parameter of the UE context shared between the UE, the source Core network element and the target Core Network element.

This parameter equivalently means that when a registration update is needed at next IRAT change due to an ISR deactivation triggering event, it is needed for the only purpose to guarantee that the CN node in the target RAT is updated so that its UE context is synchronized with the UE context that was modified in the core network element of the source mobile network.

The parameter NFR-sync may have a value TRUE to indicate that one or more triggering events for deactivating ISR occurred in the source RAT, generating a need for registration update at next IRAT change, and only correspond to a UE context modification. This value means that the registration update at next IRAT change is required and only needed in order to trigger a resynchronization of the UE context stored in the target Core network Element by transferring the modified UE context stored in the source Core network element to the target CN element during the registration update in the target RAT.

The parameter NFR-sync may have a value FALSE to indicate that no triggering event for deactivating ISR occurred in the source RAT or that at least one trigger for deactivating ISR different than only a UE context modification occurred in the source RAT. If an ISR deactivation triggering event modifies a UE context parameter, generating a need for registration update at next IRAT change for resynchronizing the CN node elements, but also generating a need for registration update at next IRAT change for any additional purposes different than UE context resynchronization, the NFR-sync parameter is also reset to FALSE. For example, parameter NFR-sync is reset to FALSE after a Location Area Update with the MSC CN node in Circuit Switch domain because the registration update in the target RAT aims at creating an SGs interface in the network, or when the Deactivate ISR timer expires because the UE context is deleted.

At FIG. 6, it is assumed that the ISR procedure is activated and the UE 2 is simultaneously registered in a list of Tracking Areas held by the MME 4 and in a Routing Area held by the SGSN 8. A context modification in the source RAT MME 4 (arrow 30) triggers the deactivation of the ISR procedure in the UE 2 while in the LTE Network 6.

When the UE 2 moves to the 2G/3G network, and the UE 2 recognizes that the IRAT change is an handover and that the target cell belongs to an area already registered with the network, and that the ISR deactivation triggering event in source RAT only correspond to a modification of the UE context, the UE cancels the need for registration in the target RAT. Thus, when no other regular triggers of the registration update apply, the registration update is avoided in the target RAT, thereby optimizing the signalling reduction, compared to a UE not implementing the method in FIG. 5.

Figure 7:
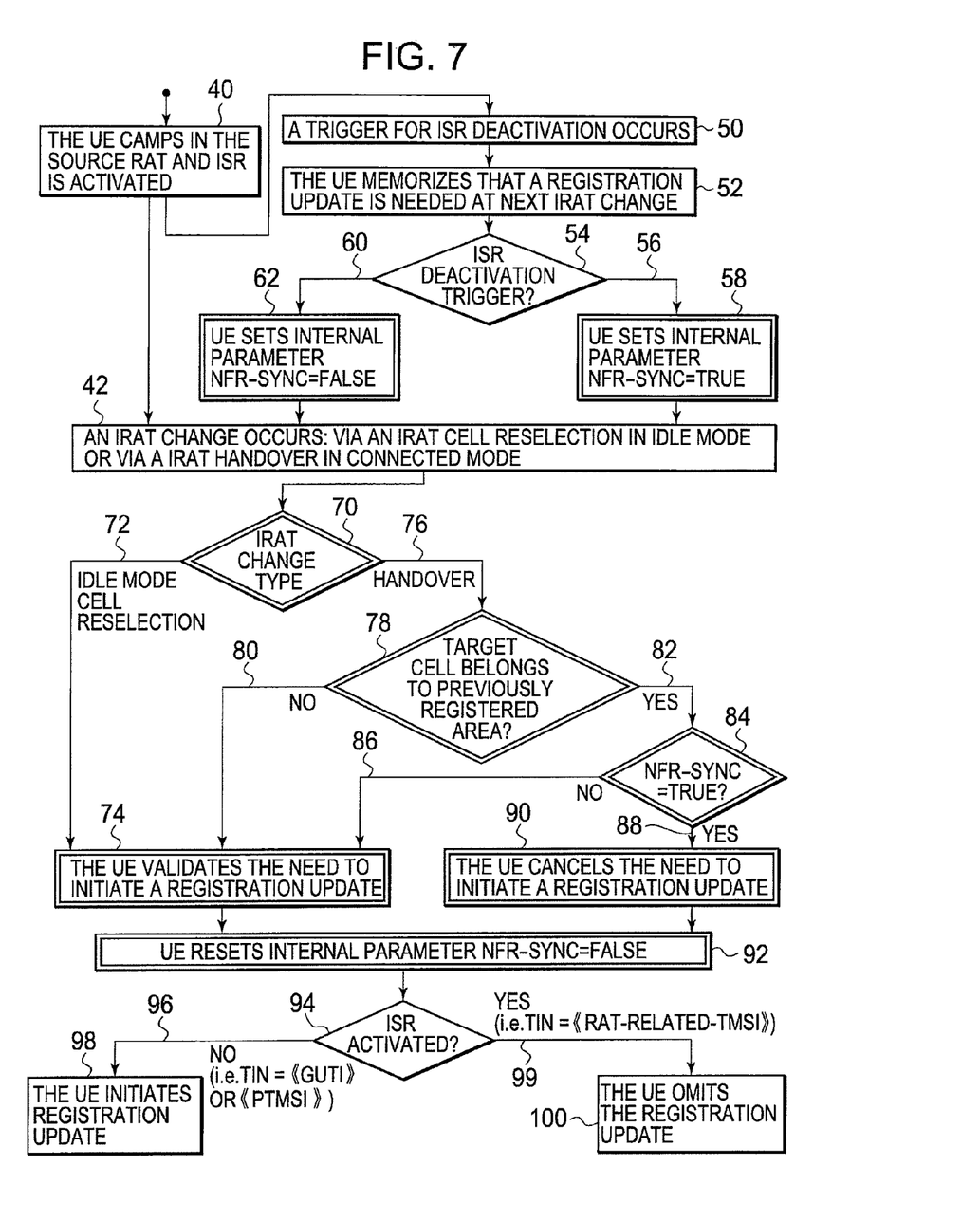
FIG. 7 is a flow chart illustrating the steps of the method for managing need for registration at a next IRAT change according to the invention.

FIG. 7 illustrates the main concept of the invention.

It is assumed that the UE 2 is camping on a cell of the source Network LTE 6 (respectively 2G3G 10) and has registered to MME 4 (step 40) (respectively SGSN 8) and the source mobile telecommunication network MME 4 (respectively SGSN 8) has indicated "ISR is activated".

Two situations may happen. In the first one, an Inter-RAT change occurs at step 42, via an IRAT cell reselection in idle mode or via an IRAT handover in connected mode.

In the second one, one or more event occur that trigger an ISR deactivation step (50). This event may be an explicit ISR deactivation by the Network or a local ISR deactivation trigger event by the UE.

In the second situation, (step 50) after an explicit ISR deactivation by the Network or a local ISR deactivation by the UE 2, the UE 2 memorizes at step 52 that a registration update is needed at next IRAT change due to a deactivation of the signalling reduction scheme.

At step 54, the UE 2 determines the event that has triggered the ISR deactivation.

If said event is a only UE context modification in the UE 2 and CN node of source RAT 4, and if no other trigger of ISR deactivation occurred (arrow 56), then the UE 2 sets (step 58) internal parameter NFR-sync=TRUE to memorize that the need for registration update at next IRAT change generated by an ISR deactivation trigger is only due to a modification of UE context, and executes steps 42 to 100.

If the ISR deactivation was triggered by any other event different from only a UE context modification in the UE 2 and CN node of source RAT 4 (arrow 60), then, at step 62, the UE 2 sets internal parameter NFR-sync=FALSE to memorize that the need for registration update at next IRAT change generated by an ISR deactivation trigger is due to another trigger than only a modification of UE context and executes steps 42 to 100.

For both situations, at step 42, the UE executes an IRAT change which can be an idle mode cell reselection or a handover. Then, the UE 2 verifies (step 70) whether the IRAT change is due to cell reselection in idle mode or to an IRAT handover in connected mode.

If the IRAT change is due to cell reselection in idle mode (arrow 72), then the UE 2 validates (step 74) the need to initiate a registration update by updating the ISR state to ISR deactivated if a different value is stored.

If the IRAT change is due to handover in connected mode (arrow 76), at (step 78), the UE 2 checks whether the target cell belongs to previously registered area or not.

If the target cell does not belong to a previously registered area (arrow 80), the UE 2 executes the step 74.

Else (arrow 82), the UE 2 reads (step 84) the value of the NFR-sync parameter.

If NFR-sync=FALSE (arrow 86), the UE 2 executes the step 74.

If NFR-sync=TRUE (arrow 88), the UE 2 cancels the need to initiate a registration update: the UE 2 updates (step 90) the ISR state to ISR activated, if a different value is stored.

After each one of step 74 or step 90, the UE 2 resets internal parameter NFR-sync=FALSE (step 92), and verifies at step 94 the value of the ISR state TIN parameter.

If ISR state is deactivated, i.e. TIN="GUTI" or "PTMSI" (arrow 94), then the UE 2 initiates registration update at step 98.

If ISR state is activated, i.e. TIN=RAT-related-TMSI (arrow 99), the UE 2 omits the registration update as indicated at step 100, when other regular RAU/TAU trigger conditions are not met.

Figure 8:
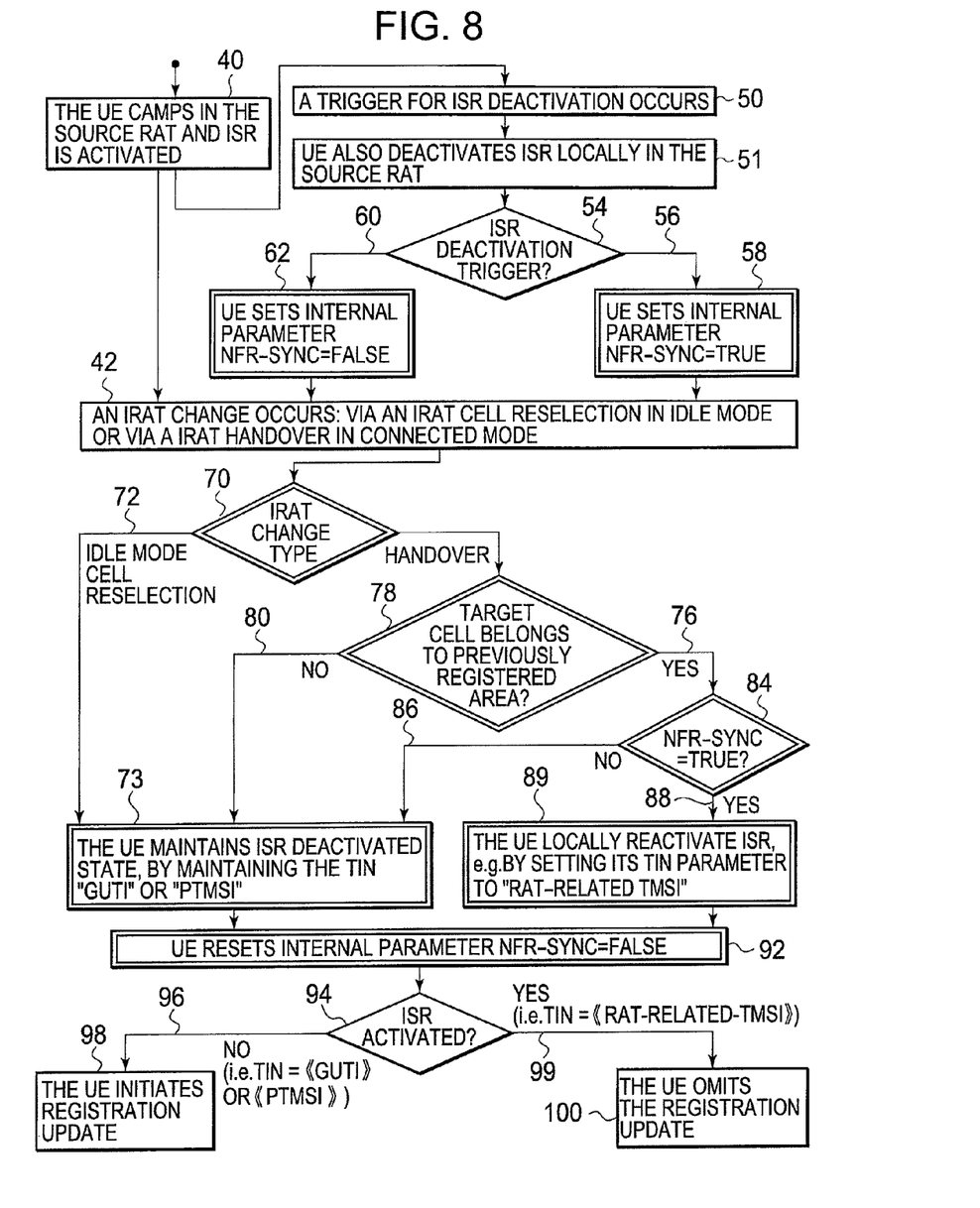
FIG. 8 is a flow chart illustrating the steps of the method according to a first variant of the invention.

FIG. 8 illustrates an embodiment of the invention using a real-time ISR local deactivation upon UE context modification in the source RAT. In this case all the steps of FIG. 7 are executed similarly except for step 52 which is replaced by a new step 51 in which the UE 2 deactivates the ISR function locally while camping on the source RAT, e.g. by setting its TIN to "PTMSI" in GERAN/UTRAN and to "GUTI" in EUTRAN and for step 74 and 90 which are respectively replaced by steps 73 and 89. In step 73 the UE 2 maintains ISR deactivated state, by maintaining the TIN to "GUTI" or "PTMSI", and in step 89 UE 2 locally reactivate ISR function, e.g. by setting its TIN parameter to "RAT-related TMSI".

Figure 9:
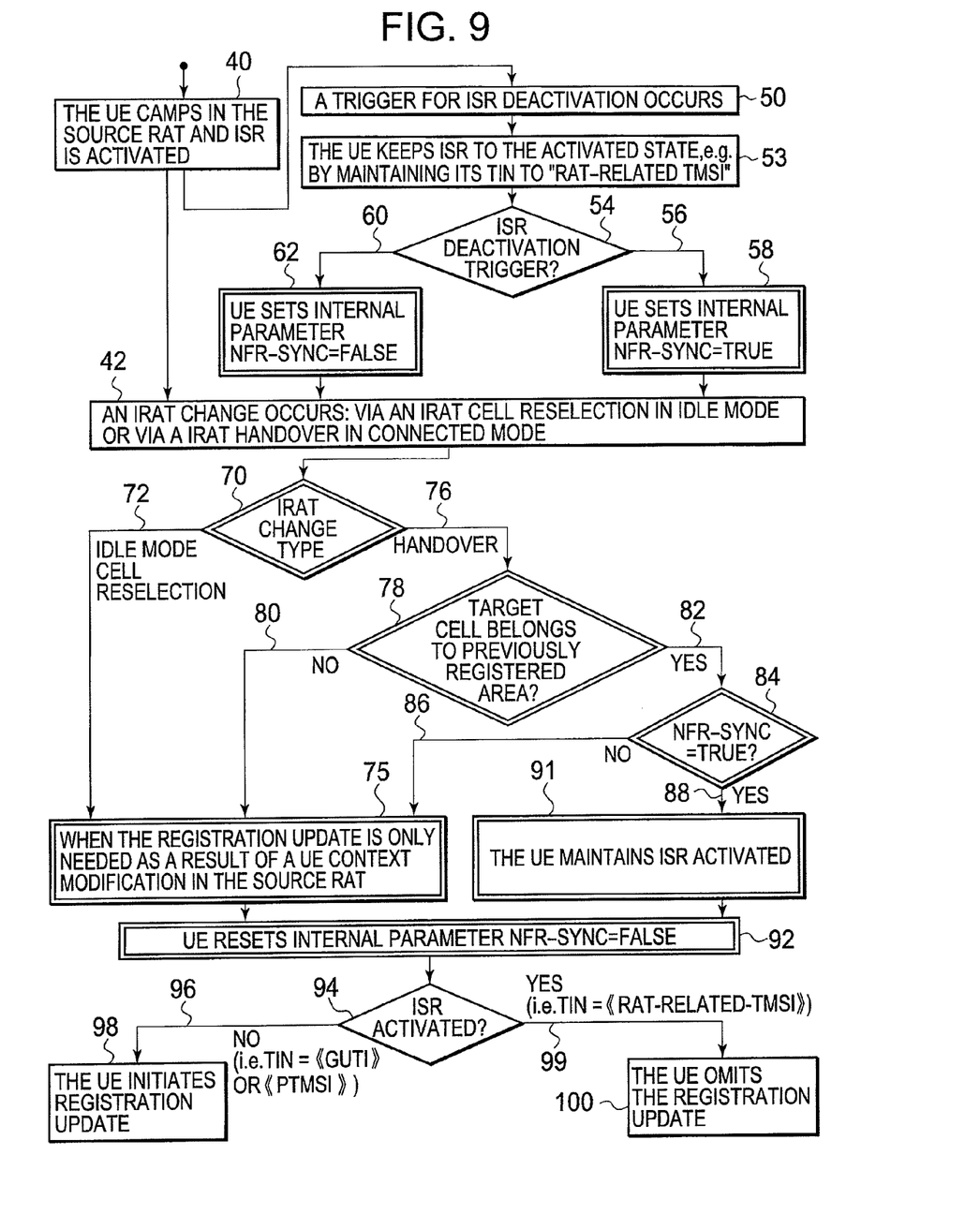
FIG. 9 is a flow chart illustrating the steps of the method according to a second variant of the invention.

FIG. 9 illustrates an embodiment of the invention using a postponed ISR local deactivation upon UE context modification in the source RAT. In this embodiment, all the steps of FIG. 7 are executed similarly except for step 52 which is replaced by a new step 53 in which the UE keeps ISR function in the activated state, e.g. by maintaining its TIN to "RAT-related TMSI" and for step 74 and 90 which are respectively replaced by a step 75 an 91.

In step 75, when the registration update is only needed as a result of a UE context modification in the source RAT (NFR-sync=TRUE) 4, the UE 2 applies the ISR local deactivation, by setting its TIN to "PTMSI" if coming from GERAN/UTRAN and to "GUTI" if coming from EUTRAN.

In step 91, the UE 2 maintains the ISR function activated, e.g. by maintaining its TIN parameter to "RAT-related TMSI".

This application is based upon and claims the benefit of priority from European patent application No. 09151818.3, filed on Jan. 30, 2009, the disclosure of which is incorporated herein in its entirety by reference.

The invention claimed is:

1. Method for optimizing the reduction of mobility signaling after an Inter-Radio Access Technology (IRAT) change for a User Equipment (UE) roaming between a source area covered by a source telecommunication core network (CN) having a source Radio Access Technology (RAT) and a target area covered by a target core telecommunication network having a target RAT, wherein a signaling reduction function is activated by the source telecommunication core network, and wherein deactivation triggering events of the signaling reduction function generates a need for registration update at next IRAT change occurred, the method being characterized by the following steps:
a—storing in the UE a parameter the value of which indicates whether or not the deactivation triggering events of the signaling reduction function only correspond to a UE context modification in the source RAT, and, after the IRAT change,
b—checking the event generating said IRAT change, and,
c—checking the value of said parameter,
d—cancelling the need for registration update or validating the need for registration update depending on the event generating said IRAT change and on the value of the stored parameter.

2. Method according to claim 1 consisting in cancelling the need for registration update if event generating said IRAT change is a handover to an area already registered with a CN node of the target RAT and if the value of the stored parameter indicates that the deactivation triggering events of the signaling reduction function only correspond to the UE context modification in the source RAT.

3. Method according to claim 1 consisting in validating the need for registration update if event generating said IRAT change is a handover to an area not already registered with a CN node of the target RAT.

4. Method according to claim 1 consisting in validating the need for registration update if event generating said IRAT change is an idle-mode cell reselection.

5. Method according to claim 1 wherein before said IRAT change, said signaling reduction function is either in an active state or in an inactive state according to the value of a Temporary Identify used in Next update (TIN) parameter stored in the UE.

6. Method according to claim 5 wherein if the signaling reduction function is locally deactivated in the UE before said IRAT change, said UE locally reactivates said signaling reduction function by setting TIN parameter to a value corresponding to the active state for cancelling the need for registration update after the IRAT change.

7. Method according to claim 5 wherein if the signaling reduction function is locally activated in the UE and if the value of the parameter indicating the deactivation triggering events indicates that the deactivation triggering events of the signaling reduction function only correspond to the UE context modification in the source RAT, then said UE locally deactivates said signaling reduction function by setting said TIN parameter to a value corresponding to the inactive state for validating the need for registration update.

8. Method according to claim 7 further comprising the step consisting in resetting the parameter indicating the deactivation triggering events after cancelling or validating the need for registration update.

9. Method according to claim 1, wherein the source telecommunication network is a 3rd Generation Partnership Project (3GPP) evolved packet system Core Network with an Evolved Universal Terrestrial Radio Access Network (E-UTRAN) RAT respectively a 3GPP General packet radio service (GPRS) Core Network with a GSM EDGE Radio Access Network Radio (GERAN) or UTRAN RAT and the target telecommunication network is a 3GPP GPRS Core Network with a GERAN or UTRAN RAT respectively 3GPP evolved packet system Core Network with an E-UTRAN RAT.

10. Method according to claim 1 comprising the step of setting said parameter indicating the deactivation triggering events to the value indicating that the deactivation triggering events of the signaling reduction function generating a need for registration update at next IRAT change only correspond to the UE context modification in the source RAT may result from modification or activation of additional bearers.

11. Method according to claim 1, comprising the step of setting said parameter indicating the deactivation triggering events to the value indicating that the deactivation triggering events of the signaling reduction function generating a need for registration update at next IRAT change only correspond to the UE context modification in the source RAT may result from updating the source RAT CN node about a change of the UE specific Discontinuous Reception (DRX) parameters to guarantee that the CN node in the other RAT is updated at the next IRAT change.

12. Method according to claim 1, comprising the step of setting said parameter indicating the deactivation triggering events to the value indicating that the deactivation triggering events of the signaling reduction function generating a need for registration update at next IRAT change only correspond to the UE context modification in the source RAT may result from updating the source RAT CN node about the change of the UE Core Network Capabilities to guarantee that the CN node in the other RAT is also updated at the next IRAT.

13. Method according to claim 6 wherein when the UE performs an inter-system handover between GERAN/UTRAN and E-UTRAN to a previously registered area, and the UE deactivated Idle mode Signaling Reduction (ISR) locally only as a result of an activation or modification of a Packet Data Protocol (PDP) context in GERAN/UTRAN respectively an Evolved Packet System (EPS) bearer context in E-UTRAN, routing area updating in GERAN/UTRAN respectively a tracking area updating in E-UTRAN with a change of the UE specific Discontinuous Reception (DRX) parameter or the UE Core Network capabilities parameter, the UE locally reactivates ISR by setting its Temporary Identify used in Next update (TIN) to RAT-related Temporary Mobile Subscriber Identify (TMSI).

14. Method according to claim 7 wherein if the event generating said IRAT change is handover to a new area or an idle-mode cell reselection, and if the deactivation triggering events of the signaling reduction function only correspond to an activation or modification of a Packet Data Protocol (PDP) context in GERAN/UTRAN respectively an Evolved Packet System (EPS) bearer context in E-UTRAN, routing area updating in GERAN/UTRAN respectively a tracking area updating in E-UTRAN with a change of the UE specific DRX (Discontinuous Reception) parameter or the UE Core Network capabilities parameter, then the UE locally deactivates Idle mode Signaling Reduction (ISR) and thus initiates the registration.

15. User Equipment comprising means for reducing the mobility signaling generated by an Inter-Radio Access Technology (IRAT) change between a source area covered by a source telecommunication core network having a source Radio Access Technology (RAT) and a target area covered by a target core telecommunication network having a target RAT, characterized in that it further comprises:
a—means for storing a parameter the value of which indicates whether or not deactivation triggering events of a signaling reduction function generating a need for registration update at next IRAT change only correspond to the UE context modification in the source RAT, and, b—means for checking the event generating an IRAT change, and, c—means checking the value of said stored parameter, d—means for either cancelling the need for a registration update or validating the need for a registration update depending on the event generating said IRAT change and on the value of the stored parameter.

* * * * *

UNITED STATES PATENT AND TRADEMARK OFFICE
CERTIFICATE OF CORRECTION

PATENT NO. : 8,600,375 B2
APPLICATION NO. : 13/144212
DATED : December 3, 2013
INVENTOR(S) : Vincent Roger Page 1 of 1

It is certified that error appears in the above-identified patent and that said Letters Patent is hereby corrected as shown below:

In the Specification

Column 1, Line 10: Delete "PCT/JP2009/051213" and insert -- PCT/JP2010/051313 --

In the Claims

Column 11, Line 59: In Claim 8, delete "claim 7" and insert -- claim 1 --

Signed and Sealed this
Twenty-second Day of July, 2014

Michelle K. Lee
*Deputy Director of the United States Patent and Trademark Office*